US008840344B2

(12) United States Patent
Stenman (10) Patent No.: US 8,840,344 B2
(45) Date of Patent: Sep. 23, 2014

(54) ADJUSTABLE HOLE CUTTERS (76) Inventor: Bruce Winter Stenman, Prunedale, CA (US)

(*) Notice: Subject to any disclaimer, the term of this patent is extended or adjusted under 35 U.S.C. 154(b) by 553 days.

(21) Appl. No.: 13/209,359

(22) Filed: Aug. 12, 2011

(65) Prior Publication Data

US 2013/0039708 A1  Feb. 14, 2013

(51) Int. Cl.
*B23B 51/05* (2006.01)
*B28D 1/04* (2006.01)

(52) U.S. Cl.
CPC ............... *B23B 51/05* (2013.01); *B28D 1/041* (2013.01); *B23B 2251/606* (2013.01); *B23B 2251/54* (2013.01)
USPC .............. 408/67; 408/186; 408/197; 408/204

(58) Field of Classification Search
CPC .... B23B 51/05; B23B 51/048; B23B 2251/50
USPC ................... 408/204, 67, 186, 197, 196, 206; 33/636, 633, 634, 635; 144/24, 21, 20; 83/698.51, 696; 30/310
See application file for complete search history.

(56) References Cited

U.S. PATENT DOCUMENTS

| 14,705 | A | * | 4/1856 | Kern ................................ 83/666 |
| 969,535 | A | * | 9/1910 | Howe ................................ 144/24 |
| 2,618,991 | A | * | 11/1952 | Charles ........................... 408/146 |
| 2,628,512 | A | * | 2/1953 | Lankford ........................... 408/79 |
| 2,775,821 | A | * | 1/1957 | Eipper et al. ..................... 33/636 |
| 2,803,153 | A | * | 8/1957 | Golbeck ......................... 408/174 |
| 2,822,008 | A | * | 2/1958 | Schaefer ......................... 144/219 |
| 2,872,736 | A | * | 2/1959 | Abbott ............................. 33/637 |
| 3,257,871 | A | * | 6/1966 | Goodyear ....................... 408/218 |
| 3,272,243 | A | * | 9/1966 | Hayes, Sr. ....................... 144/20 |
| 3,298,107 | A | * | 1/1967 | Bergstrom ....................... 33/636 |
| 3,365,988 | A | * | 1/1968 | Karlan ........................... 408/196 |
| 3,428,100 | A | * | 2/1969 | Melpolder ....................... 408/99 |
| 3,771,895 | A | * | 11/1973 | Meyer ............................ 408/174 |
| 3,999,869 | A | | 12/1976 | Clark et al. |
| 4,147,464 | A | * | 4/1979 | Watson et al. ................. 408/206 |
| 5,236,290 | A | * | 8/1993 | Mittleman et al. ............. 408/183 |
| 5,458,444 | A | * | 10/1995 | Duncan ........................... 408/80 |
| 6,007,279 | A | * | 12/1999 | Malone, Jr. .................... 408/204 |
| 6,120,220 | A | * | 9/2000 | Speare .......................... 408/1 R |
| 6,171,032 | B1 | * | 1/2001 | Forche et al. ................... 408/67 |
| 6,206,616 | B1 | * | 3/2001 | Smith et al. ................... 408/1 R |
| 6,457,915 | B1 | * | 10/2002 | Kao ............................... 408/67 |

(Continued)

FOREIGN PATENT DOCUMENTS

| DE | 4028830 A1 | * | 3/1992 |
| EP | 1447194 A1 | * | 8/2004 |
| FR | 2704790 A1 | * | 11/1994 |

OTHER PUBLICATIONS

Ratio Bit System Web Page, dated Jan. 2011.

*Primary Examiner* — Daniel Howell
*Assistant Examiner* — Nicole N Ramos
(74) *Attorney, Agent, or Firm* — Renner Kenner Greieve Bobak Taylor & Weber (57) ABSTRACT

An adjustable hole cutter for cutting a hole with a predetermined diameter in sheet or panel material includes a blade holder that moves along a track or slot to alter a diameter of the cut hole; a blade arc adjuster coupled to the blade holder; and one or more replaceable blade segments coupled to the blade holder.

15 Claims, 11 Drawing Sheets

(56) References Cited

U.S. PATENT DOCUMENTS

| | | | |
|---|---|---|---|
| 6,814,527 B1 * | 11/2004 | Fleming | 408/67 |
| 6,857,831 B2 * | 2/2005 | Davis | 408/206 |
| 7,104,738 B2 | 9/2006 | Cantlon | |
| 7,175,372 B2 | 2/2007 | Davis | |
| 7,901,164 B2 * | 3/2011 | Skradski et al. | 408/67 |

* cited by examiner

| Hole Size in Millimeters | Versine in Millimeters |
|---|---|
| 100 | 6.70 |
| 110 | 6.00 |
| 120 | 5.46 |
| 130 | 5.00 |
| 140 | 4.62 |
| 150 | 4.29 |
| 160 | 4.00 |
| 170 | 3.76 |
| 180 | 3.54 |
| 190 | 3.35 |
| 200 | 3.18 |
| 210 | 3.02 |
| 220 | 2.88 |
| 230 | 2.75 |
| 235 | 2.69 |
| 240 | 2.63 |
| 250 | 2.53 |
| 260 | 2.43 |
| 270 | 2.34 |
| 280 | 2.25 |
| 290 | 2.17 |
| 300 | 2.10 |
| 305 | 2.08 |

ADJUSTABLE HOLE CUTTERS

FIELD OF INVENTION

The present invention relates to adjustable hole cutters.

BACKGROUND OF INVENTION

In many construction, installation, and fabrication and industrial tasks a hole needs to be made in a ceiling, wall, flooring, or panel, for passage of wiring, piping, or ducting, for installing a fixture, or other purpose. The larger the hole the less likely that a fixed size hole saw exists in the size needed, and the cost for individual custom made hole saws can be prohibitive. At the same time there are materials which include ceramic tiles and sheet metal that cannot be readily cut with the prior art designs of adjustable hole cutters.

With a material such as thin sheet metal the point of the prior art cutting blade will puncture the metal at one point in the circumference of the hole being cut and then the drill will not have sufficient power to continue the cutting operation. With ceramic materials such as with floor tile the contact area of the blade tip or edge is too small for effective cutting regardless of the blade material composition or design. A long blade edge with high speed steel or tungsten carbide teeth, or a tungsten carbide or diamond grit edge, is needed to efficiently and reliably cut these types of materials. The present invention provides an apparatus that employs long rectangular blade sections and with the ability to cut a wide range of hole diameters in these and other materials, and to provide for very small incremental changes in the diameter of the hole being cut.

Another shortcoming of current designs is the use of one or two blades for the cutting. These designs are very difficult and potentially hazardous to use without an exterior ball bearing mounted shield to support the hole cutter and keep it perpendicular to the work surface unless it is used in a stationary pillar type electric drill press. The shield adds expense and requires more working space than an adjustable hole cutter without the shield. This particular shortcomings can be overcome with an adjustable hole cutter design that provides for the use of three or more evenly spaced blades.

Increasingly there are government safety and environmental and health regulations that require dust containment while cutting with a power tool. The new hole cutter design is one that can be used with current dust shield designs and with current vacuum systems. The present invention maximizes the cutting depth for the hole cutter while enabling the hole cutting apparatus to be used with a dust shield. The apparatus also enables the user to quickly remove the shield and cut without it or to store the hole cutter and the shaft and the shield in a more compact manner for safe storage and for transport in a case.

When using a longer blade section with an adjustable hole cutter there arises a problem with the need to have a different arc of the blade or for different diameter holes. The longer the blade segment used, or the smaller the diameter of the hole being cut, or the more difficult the material is to cut, as with thin sheet metal, the greater the need to have the arc of the blade match the arc of the circumference of the hole to be cut.

An adjustable hole cutter using long cutting segments (blades) needs to provide a mechanism that is able to position the blade or blades the correct distance from the center of the hole cutter and its drive shaft or arbor, and equally important the adjustable hole cutter must also provide a means for users to adjust the arc of the blade or blades to match the arc of the hole to be cut as well. Additionally with more than one blade there is a need to provide a means to insure that the cutting blades are equidistant from the center of the drive shaft or arbor so that all blades track in the same groove. If they are not equidistant they will cut their own groove and the amount of torque and power needed from the power drill will increase proportionate to the number of blades used and the maximum hole size which can be cut with a hand held power drill will be greatly reduced.

SUMMARY

In one aspect, an adjustable hole cutter for cutting a hole with a predetermined diameter in sheet or panel material includes a blade holder that moves along a track or slot to alter a diameter of the cut hole; a blade arc adjuster coupled to the blade holder; and one or more replaceable blade segments coupled to the blade holder.

Implementations of the above aspect may include one or more of the following. Cutting holes with a hand held power drill or the like may be accomplished in combination with a hole cutting apparatus concentrically attached to a rotating portion of the power drill. As the hole diameter increases, the required torque to rotate it increases proportionately. A hole cutting apparatus in accordance with the preferred embodiment of the invention has a number of circumferentially arrayed cutting members, each mounted to a moveable support, configured to keep cutting forces uniform and the rotational forces in balance.

In another aspect, an adjustable hole cutter for cutting a hole with a predetermined diameter in sheet or panel material includes a blade holder that moves along a track or slot to alter a diameter of the cut hole, the blade holder having a base plate; a disc or spoked wheel coupled to the blade holder; one or more replaceable blade segments coupled to the blade holder; a blade arc adjuster coupled to the blade holder; a drive shaft with a square section to mount into a hub of the disc or a spoked wheel for the hub, wherein the hub and drive shaft move in unison with a pin or screw that transects the drive shaft and hub; and one or more markings on the base plate to indicate a position for an apex of an arc of the cutting blade for the predetermined diameter and wherein each mark is a nominal value for the diameter of the hole to be cut.

The hole cutting apparatus has a circular disc shaped design with multiple spokes which each have a slot for the movement of the blade holder apparatus. The center of the disc has a hub for inserting a shaft which provides a means to attach the hole cutting apparatus to the chuck of a power drill, with or without a protective dust shield for the hole cutter. A pilot drill bit is held in place at the opposite end of the shaft. The pilot drill bit drills a hole in the work piece such that the apparatus is centered during the hole cutting operation. The drill bit extends sufficiently beyond the cutting members (and the shield when the longer shaft is used) to drill the pilot hole sufficiently deep before the cutting members make contact with the surface of the work piece.

As the cutting apparatus is forced toward the work piece, the cutting edges of the cutting members gradually remove material along an increasingly deep concentric groove until a portion of the work piece inside the concentric groove becomes separated from the remaining work piece.

In the preferred embodiment, the apparatus is configured with the disc hub and spoke in different diameters to provide different minimum and maximum hole cutting capabilities, and to work with dust shields having different diameters.

There are separate blade holder assemblies to which each of the blades or cutting members are attached. This blade holder assembly is key to the functioning of the preferred embodiment of the invention. The blade holder assembly provides three key functions: 1) it supports the blade 2) it enables changing the position of the blade along the radius of the hole cutter for cutting different size holes 3) it provides for adjusting the arc of the blade or cutting member to match those of the given diameter hole to be cut. Additionally the design of the blade holder assembly enables quick removal and replacement of the cutting members.

There is a separate detachable tool that provides a way to quickly determine and position each of the blades the same distance from the drive shaft of the apparatus. With the use of this detachable cutting radius gauge the overall design of the hole cutting apparatus is simplified without detracting from its performance.

The hole cutter can be used for cutting holes in sheet materials or boards of varying diameters with those diameters set by the operator. Instead of needing multiple hole saws for different size holes a single adjustable hole cutter can be used instead. Using multiple sections of blade material instead of a continuous band of teeth greatly reduces the power required to rotate the hole cutter and cut the material so a less powerful and hand held drill can be used to cut larger diameter holes than would otherwise be possible.

DETAILED DESCRIPTION

Figure 1:
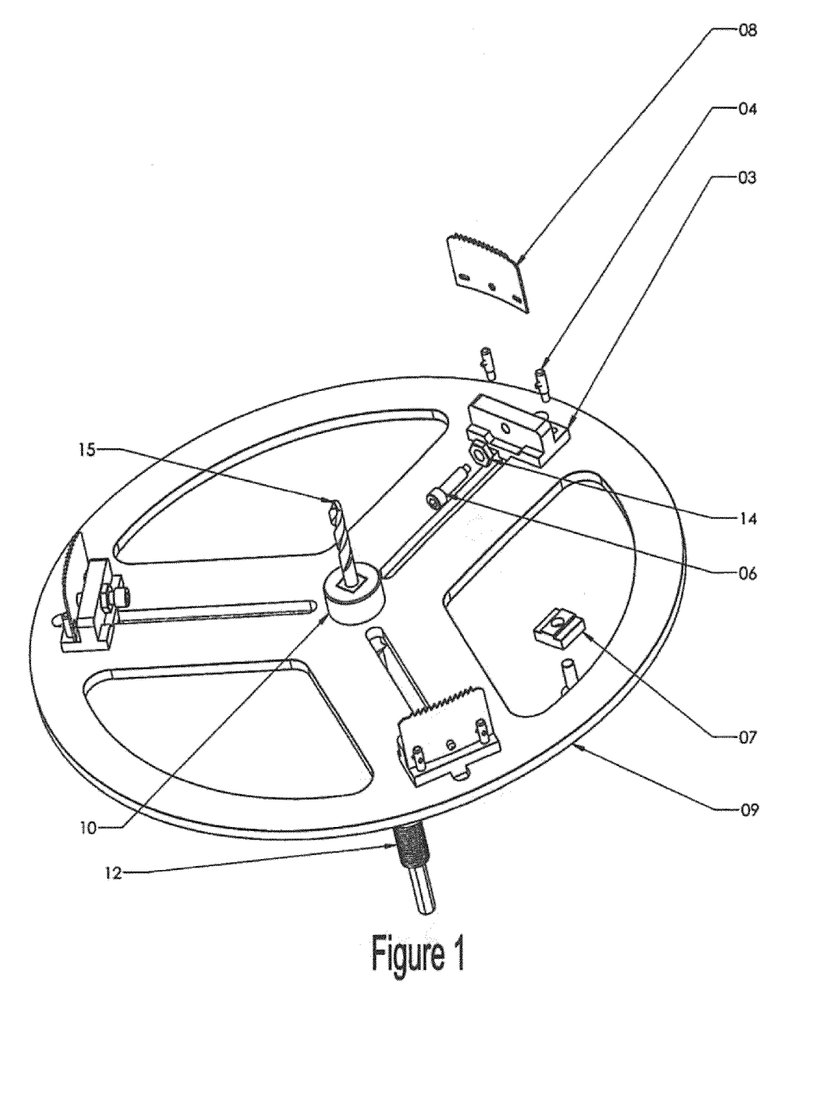
FIG. 1 shows a perspective top view of the first embodiment of the invention.

Referring to FIG. 1, the present invention is a hole cutting apparatus configured to be attached to a rotating portion of a power drill. The power drill may be substituted by other well-known devices configured for receiving and rotating other well known apparatus performing rotating operations. The apparatus shown in FIG. 1 is axially attached via a shaft which functions as an arbor drive shaft 12 which may have a hexagonal shape to retain it in a rigid manner in a three jaw clamping device attached to the power drill. The arbor drive shaft 12 may have other configurations as are well known in the art for transmitting torque to its rotational axis. From the top side of the arbor shaft extends a pilot drill bit 15, which is in axial alignment with the arbor drive shaft 12.

Along the radiating slots are circumferentially arrayed and attached blade holder assemblies 03 each with a cutting member 08, which are configured to gradually remove material from a work piece while keeping friction in the cutting grove to a minimum and while preventing sudden biting of a cutting edge 08 in the groove as it is cut. The blade holder assemblies 03 are designed to slide along the slot to provide a given radius of hole cut and to then be locked into position for the cutting operation.

The arbor drive shaft 12 extends from the central portion of the disc 09 from which three slotted spoke sections extend in a radial direction. The radial sections connect to the central portion with a circumferential ring or hub 10. The spoke sections provide for rigid support of the blade holder assembly while keeping the overall weight of the apparatus to a minimum.

The blade holder is slid along the slot to the appropriate location as indicated by indentations on the disc 09 for the hole diameter to be cut and then is locked in position. This is done by means of a screw and a keeper plate 07. The keeper plate 07 evenly distributes the load force on the base plate 03 of the blade holder assembly.

The present invention includes the embodiment of a disc with three or more slots, or with fewer than three slots so that one, two, three, four, or more blade holders 03 with their cutting members 08 can be used with the apparatus. The fewer the number of cutting members, the less the power required from the electric drill to operate the apparatus and cut the work piece. More cutting members improve the balance of the apparatus and provide a more uniform cutting action and help to keep the disc 09 with the cutting members 08 in alignment with the work piece when a shield is not used with the apparatus.

There can be one or more but preferably three or more grove cutting members 08 attached to the blade holders 03 and arrayed equidistant from the center of the disc 09 to insure equally distributed contact pressure between the individual cutting members 08 and the work piece. The use of three or more cutting members facilitates maintaining the hole cutter apparatus in perpendicular orientation to the work piece in all directions while the cutting operation is in progress and making it easier to manage the operation when a ball bearing mounted dust shield is not being used.

An adjustable hole cutter for cutting holes of various diameters in sheet and panel materials, using a blade holder that slots along a track or slot to alter the diameter of the cut hole and incorporating a blade arc adjustment mechanism. The slots can be in a disc or in a spoke on a hub with two or more slots and an equal number of blade holders.

The blade holder is designed to enable quick changing of the blade segments both to replace ones that are worn, or to change to a blade with a different cutting edge that is optimized for the material to be cut. A screw is used to make incremental changes to the arc of the blade in the blade holder so that it conforms to the arc of the circle for the hole being cut.

Adjusting the blade arc increases the accuracy of the hole that is cut and minimizes the width of the cut and the amount of excess material that would otherwise be removed. With multiple blades the need to keep them cutting in each others track is critical to minimize the otherwise significant increase in power needed to rotate the hole cutter. There is the potential with three blades that do not match each other with regard to their cutting radius and arc to triple the amount of power needed to operate the tool.

The design is effective with only one blade and one blade holder but two blades with two blade holders improves balance and with three or more blades the hole cutter can be used without a shield or other means of support as in a stationary or pillar electric drill press.

The hole cutter is designed to work with or without an external shield. The external shield insures that the hole cutter is perpendicular to the work piece being cut at all times which minimize the effort to control the hole cutter when using a hand held electric drill. The shield also contains all the shavings, the cut plug, and whatever is behind the wall of ceiling providing environmental protection. There is an internal ball bearing hub in the shield so that the shield can remain stationary while the hole cutter rotates and cuts the hole.

A shaft is used to mount the hole cutter and connect it to the chuck of a power drill. The shaft has a square section to mount into the hub of the disc or spoked wheel holding the blade holder assemblies. The square configuration insures that the hub and shaft move in unison while providing a strong connection. The square connection is resistant to binding and the two parts are easily separated with the removal of a pin or screw that transects the two components.

The shaft is designed to easily separate from the piece holding the blade holder assemblies for easy storage when not in use. The shaft has a compression spring on a long version of the shaft keeps the shield in place and a nut is used to keep the spring in tension and also can be used to limit the effective cutting depth of the blades so that they cut only the surface of the work piece and not wires of pipes or other items hidden behind or beneath.

A separate radius gauge tool is used to insure that all the blades are equidistant from the drive shaft or arbor of the hole cutting apparatus.

Figure 2:
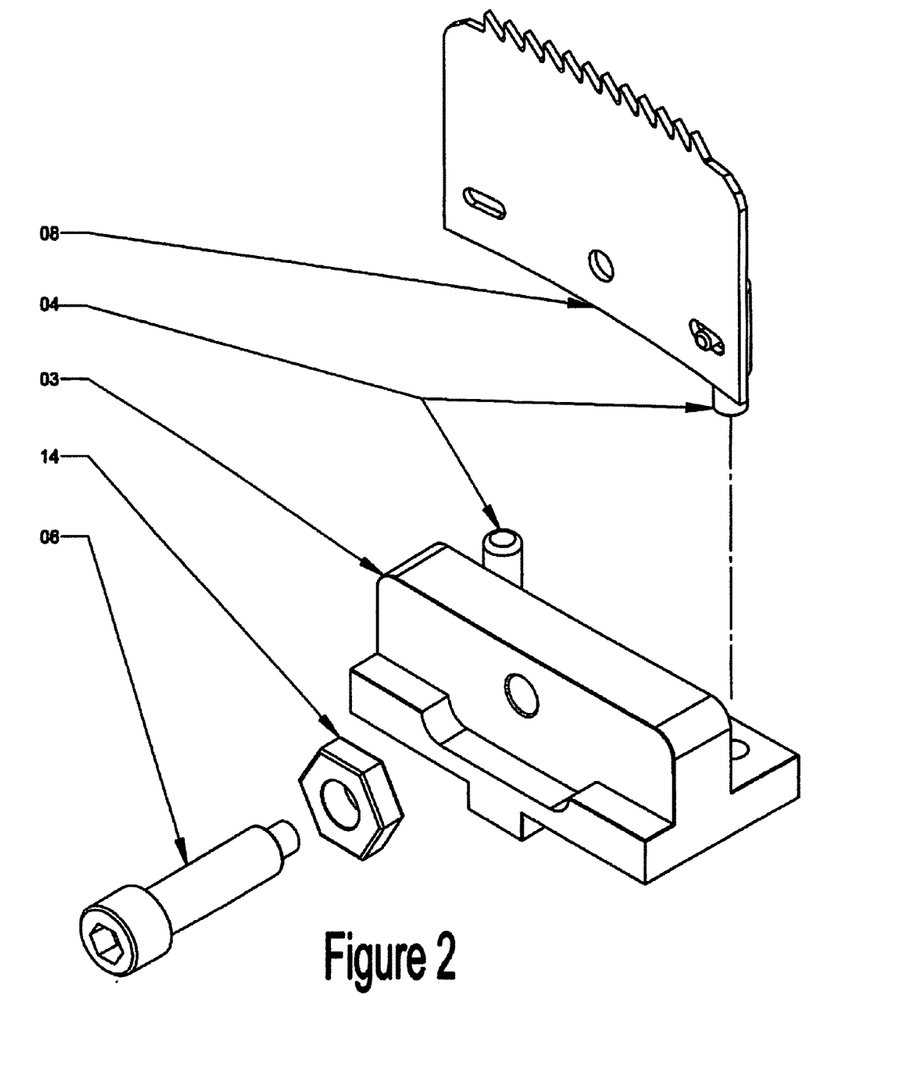
FIG. 2 shows a perspective view of the blade holder portion of the apparatus including a cutting member.

Referring to FIG. 2, the blade holder assembly for the apparatus consists of a base 03, two vertical pins 04 with laterally protruding pins, an adjustment screw 06, and a jam nut 14. This assembly provides a mechanism to both retain the cutting member or blade 08, and to adjust its arc to match the arc of the circle of the size hole to be cut.

The slots in the cutting member or blade 08 are offset so that the user pushes the blade over the protrusions from the pin assembly 04, and then slides the blade so that the hole is centered over the tip of the adjustment screw 06. The combination of the two lateral protrusions and the adjustment screw keep the cutting member or blade 08 in position while the apparatus is in operation. Marks on the blade holder indicate the position of the blade for the correct arc for a given diameter hole.

The slots in the cutting member or blade 08 allow the chord of the arc of the blade to change while restricting the vertical movement of the blade away from the base of the blade holder 03. The adjustment screw 06 exerts pressure on the center of the cutting member or blade 08 to move it away from the pins 04 and precisely adjust the arc of the cutting member of blade 08 so as to match that of the diameter of the size hole to be cut. As the screw is tightened the blade arc is increased allowing for the smooth cutting of a smaller diameter hole. The jam nut 14 prevents unwanted rotation of the adjustment screw 06 after it is in position. The blade holder 08 with the adjustment screw 06 serves an additional function in restricting the movement of the blade horizontally or vertically during the cutting operation.

Figure 3:
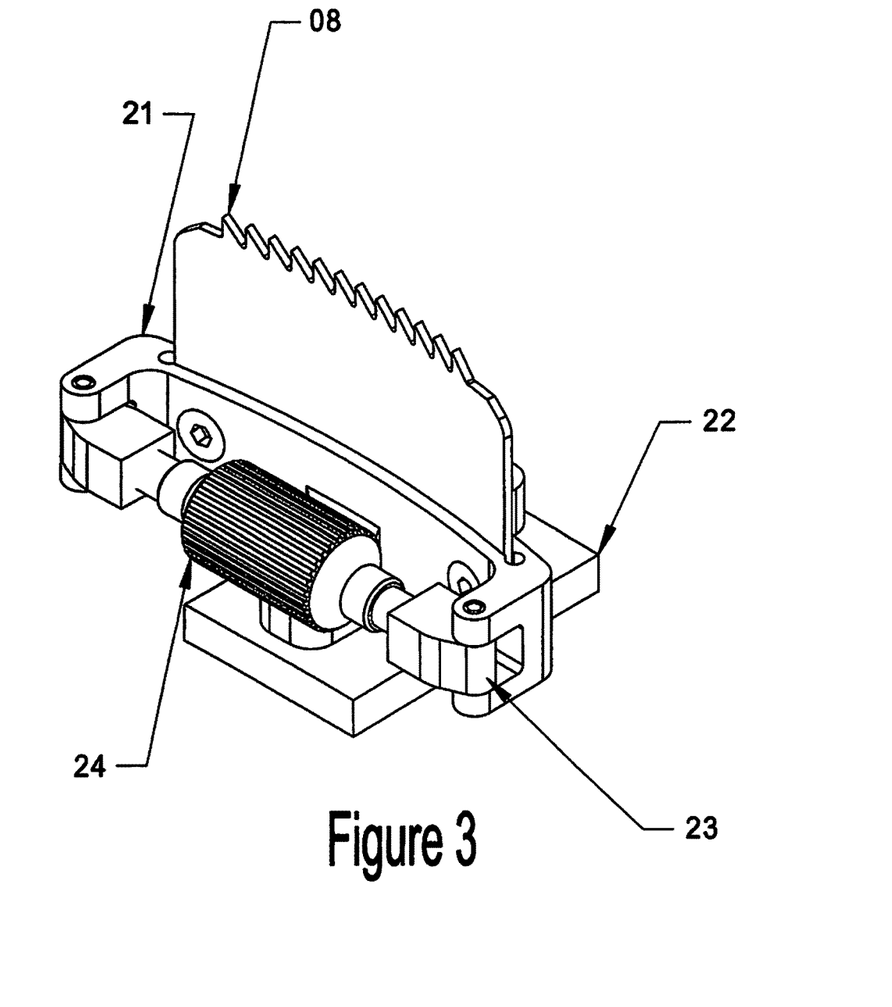
FIG. 3 shows a perspective view of an alternative blade holder assembly with a cutting member.

Referring to FIG. 3, the present invention includes embodiments as depicted with a blade holder assembly that can provide for very small incremental adjustments to the blade arc if needed. In some situations as with cutting glass or very thin materials a thinner and more flexible cutting member or blade is preferable and more precise arc adjustments need to be made. The cutting member or blade 08 is inserted into the blade holder 21 with its torsion rod 24 and clevis 23 mechanism which provides a means to precisely adjust the arc of the blade 08. The blade holding assembly is mounted to a base plate 22 which can be positioned along the slot of the disc and tightened in place set the diameter of the hole to be cut in the work piece.

Figure 4:
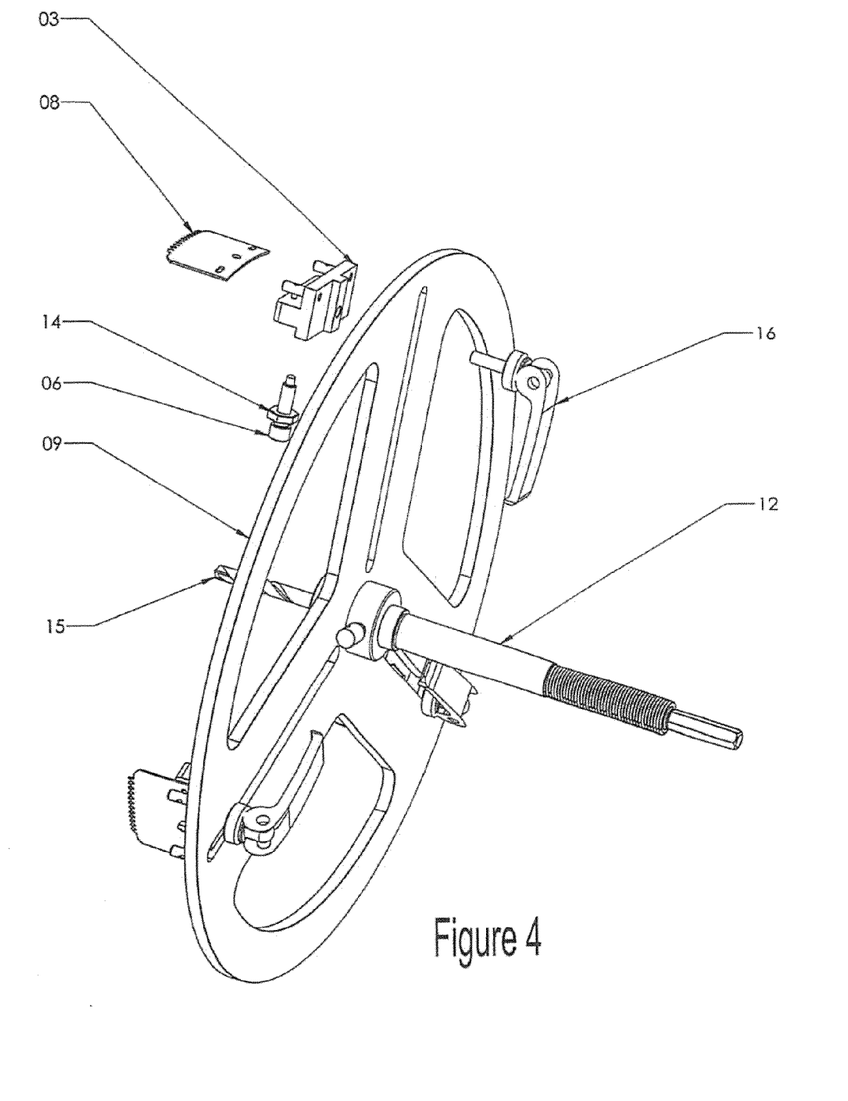
FIG. 4 shows a perspective view of the bottom of the apparatus with a cam lever mechanism to secure the blade holder assembly at a position along the slot.

Referring to FIG. 4, the apparatus requires the loosening of the blade holder 03 so it can be slide along the slot of the disc and then retightened in its new position. The present invention includes embodiments as shown with the use of a cam lever to secure the position of the blade holder and its cutting member without the need for an additional tool. The cam lever 16 has a mounting screw which threads into the base of the blade holder 03. The cam lever 16 can be orientated either toward the drive shaft 12 or away from it depending upon the location of the blade holder 03 along the slot.

Figure 5:
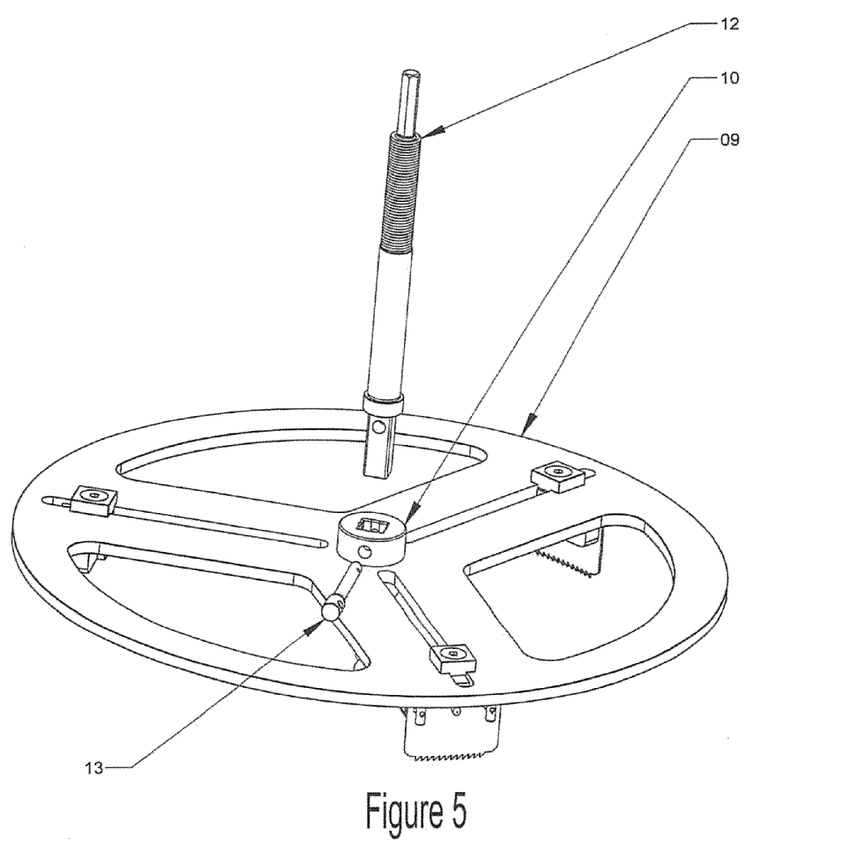
FIG. 5 shows a perspective bottom view of the first apparatus.

Referring to FIG. 5, the arbor drive shaft 12 has a square section that is inserted into a hub or disc which has a matching square aperture. There is a flange on the drive shaft 12 so that when pressure is applied with the power drill and force is applied to the disc 09, there is no force applied to the detent pin 13. The square shape of the drive shaft 12 insures that it moves in unison with the rotational power of the drill with a strong connection that is able to transmit the drill's torque without weakening the connection of the drive shaft 12 to the disc through the hub 10, and the two parts, 12 and 10 are easily separated after use by removing the detent pin 13.

The present invention includes embodiments in which the end of the drive shaft 12 can be threaded as well as the hub 10 as a means of attaching the disc to drive shaft 12 and with the hex end inserted into the chuck or similar power drill attachment mechanism.

Figure 6:
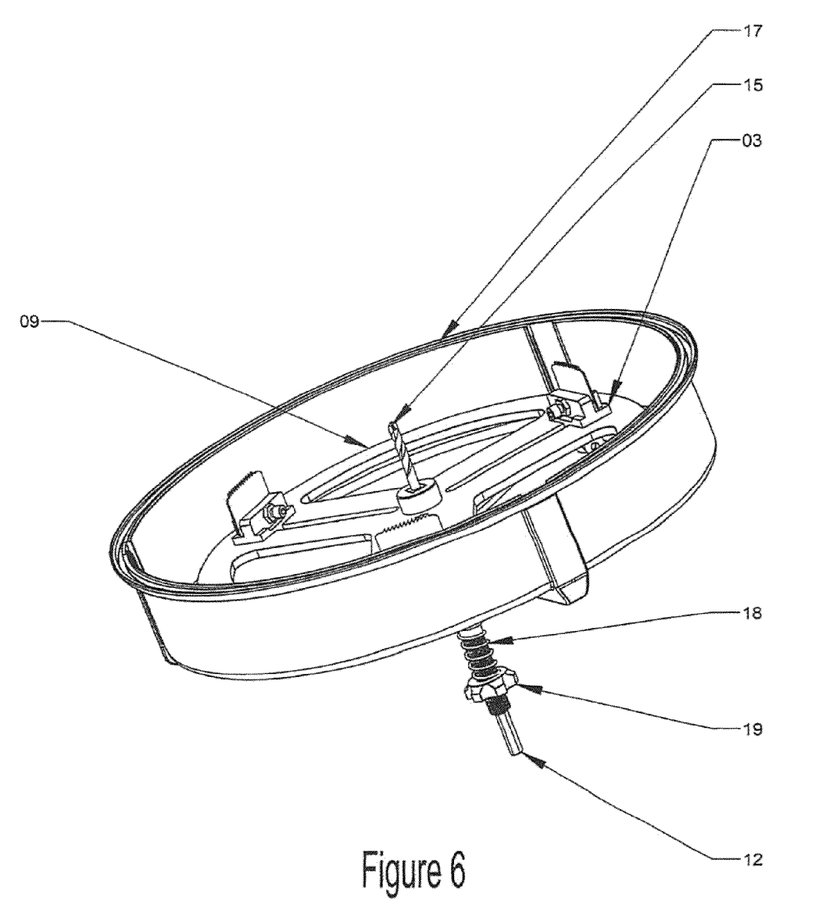
FIG. 6 shows a perspective view of the apparatus with a dust shield mounted to a central shaft.

Referring to FIG. 6, the apparatus is depicted with a dust shield that can be incorporated into the assembly. The shield is held in place with the spring 18 and the tensioning nut 19. The shield collects the dust and shavings and contains the cut plug during the cutting operation. The shield has a ball bearing insert so that the drive shaft and the hole cutter assembly can rotate in unison while the shield stays stationary against the work piece. The drive shaft 12 is long enough to support the ball bearing mounted dust shield and to provide a threaded section for a spring 18 and a tensioning nut 19.

When the shield is not used, a shorter drive shaft can be substituted to provide a connection between the hub of the disc and the chuck of the power drill.

The present invention includes the embodiment of the shield as a means of providing lateral support keeping the hole cutter apparatus parallel to the work piece with the drive shaft 12 perpendicular to the work piece during the cutting operation. This reduces the likelihood of the cutting members binding in the groove as it is cut, improving the performance and the safe use of the apparatus.

Figure 7:
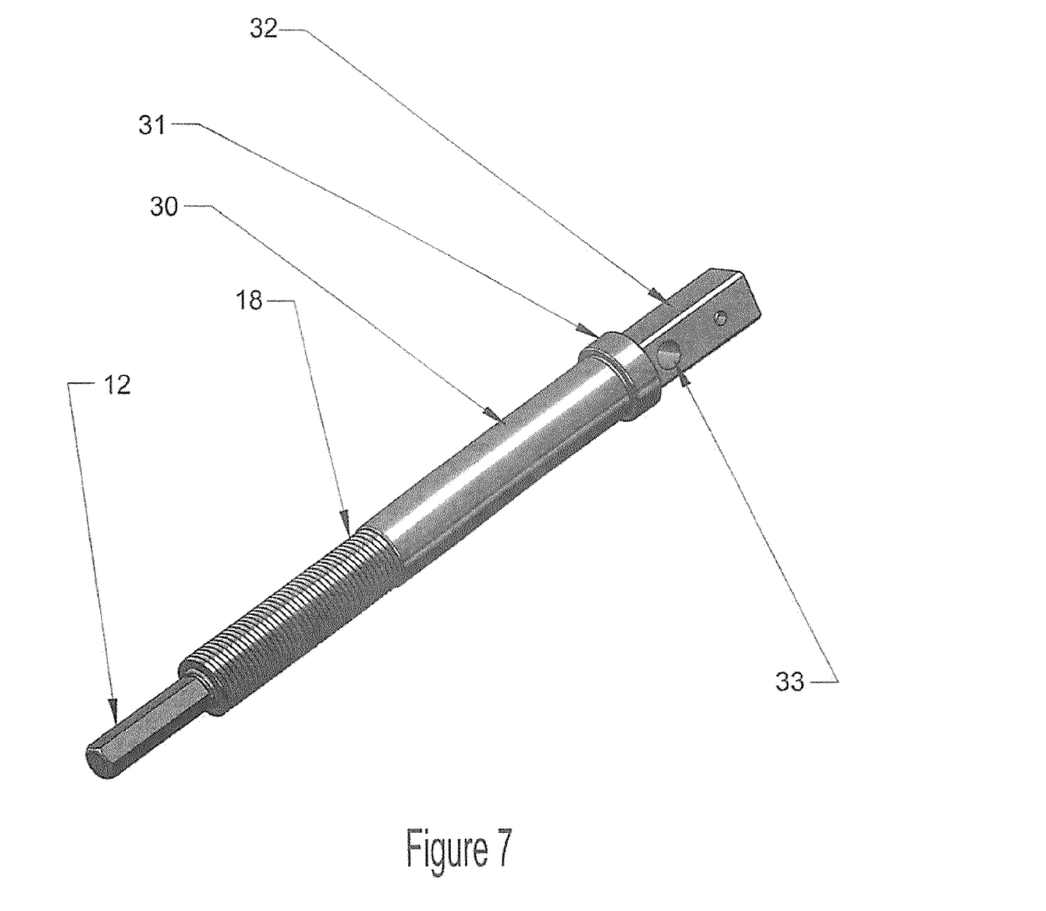
FIG. 7 shows a perspective view of the long drive shaft for use with a dust shield.

Referring to FIG. 7, the present invention includes a unique shaft design with a hexagonal section 12 to mount inside the well known chuck of a power drill. The threaded section 18 provides for the use of a tensioning spring with a ball bearing mounted shield.

An embodiment of the present invention is that the threaded section 18 is long enough to be used to adjust the range of movement of the hole cutting apparatus inside the shield. In this manner it provides the means to limit the depth of groove that is cut by the apparatus.

The long journal section 30 has an outside diameter dimension that matches that of the inside diameter of the ball bearing race of the dust shield. The flange 31 functions both as a means to restrict dust and cuttings from moving past the bearing race of the shield and outside of the shield, and it provides a solid support for the hole cutting apparatus as it is forced into the work piece during the hole cutting operation.

The square section 32 provides a means to securely attach the disc and hub of the cutting apparatus without the use of threads as with prior art. Threads which are subjected to a strong torsion load can bind and make it difficult to remove a hole cutter from the arbor drive shaft. The present invention is not subject to this problem. The aperture 33 in the square section of the shaft is used with a detent pin or screw to keep the cutting apparatus secured to the drive shaft.

The present invention includes the embodiment of a short drive shaft that is used to connect the hub 10 to the chuck of the power drill and use the apparatus to cut holes without the use of a dust shield or other stabilizing mechanism.

Figure 8:
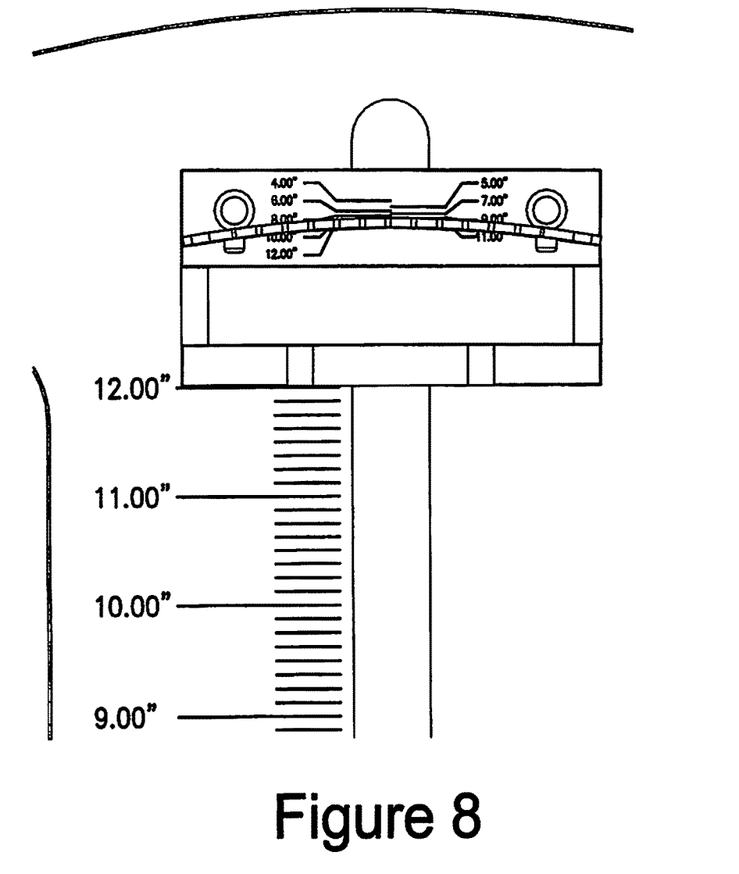
FIG. 8 shows the markings along each slot on the disc that indicate the position for the blade holder assembly for the diameter of the hole to be cut, and the markings on the base plate of the blade holder assembly used to show the correct position for the apex of the arc of the cutting blade for the diameter of the hole to be cut.

Referring to FIG. 8, the present embodiment of the invention includes a set of markings along the slots of the disc as well as a set of markings along the base of each blade holder. The markings indicate the correct position of the blade holder in the slot and the arc adjustment for the blade needed for a given size hole. There is no need for a separate measuring device or external chart to determine the correct settings for a given diameter hole to be cut with the apparatus. Each mark is a nominal value for the diameter of the hole to be cut.

Referring to FIG. 8, the present embodiment of the invention includes markings on the base plate of the blade holder assembly, which are used to indicate the correct position for the apex of the arc of the cutting blade for the size of the hole to be cut. Each mark is a nominal value for the diameter of the hole to be cut.

Figure 9:
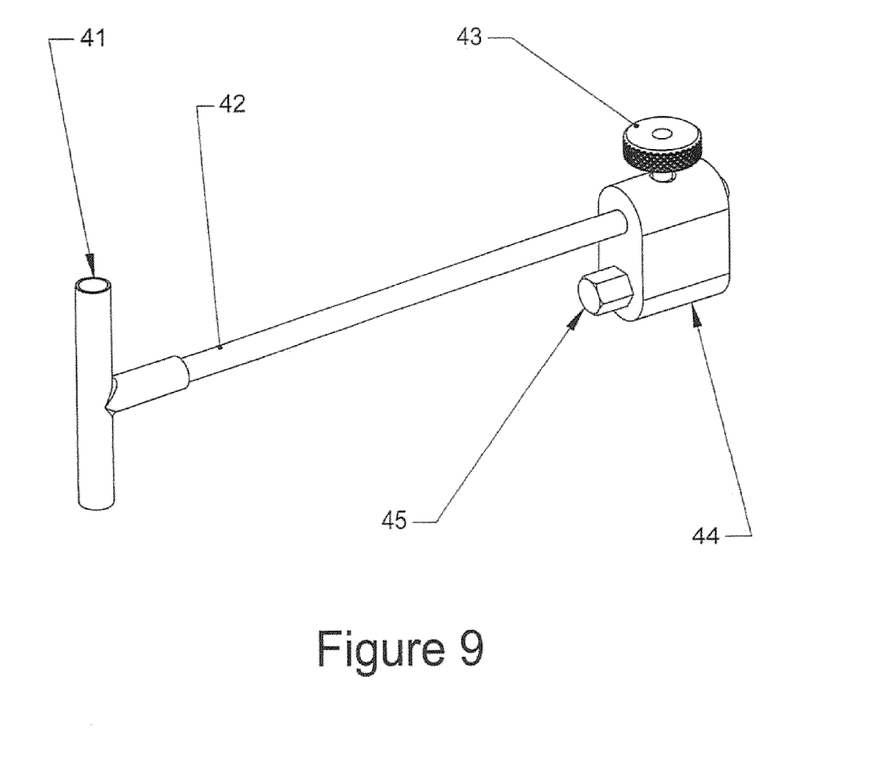
FIG. 9 shows the radius gauge use to adjust multiple blade holders so that the blades are all equidistant from the drive shaft.

Referring to FIG. 9, the present invention includes a radius gauge to insure that multiple blade holders with their blades and blade arc adjustments all have the apex of the outside edge of the blade positioned equidistant from the drive shaft. When cutting in materials where each blade must track exactly in the groove cut by one or more other blades this radius gauge makes it easy to set the blade holders at exactly the same relative distance from the drive shaft.

The radius gauge consists of a hollow tubular section 41, that slides over the pilot drill bit at the end of the drive shaft and then the radius gauge is rotated to a position where the rod 42, is located over the slot for the blade holder. The knob screw 43 is then loosened and the anvil block 44 is slid along the rod until the anvil 45 is touching the outer edge at the apex of the curved blade in the blade holder at which time the knob screw 43 is tightened and the anvil adjustment block 44 is locked into position.

Figure 10:
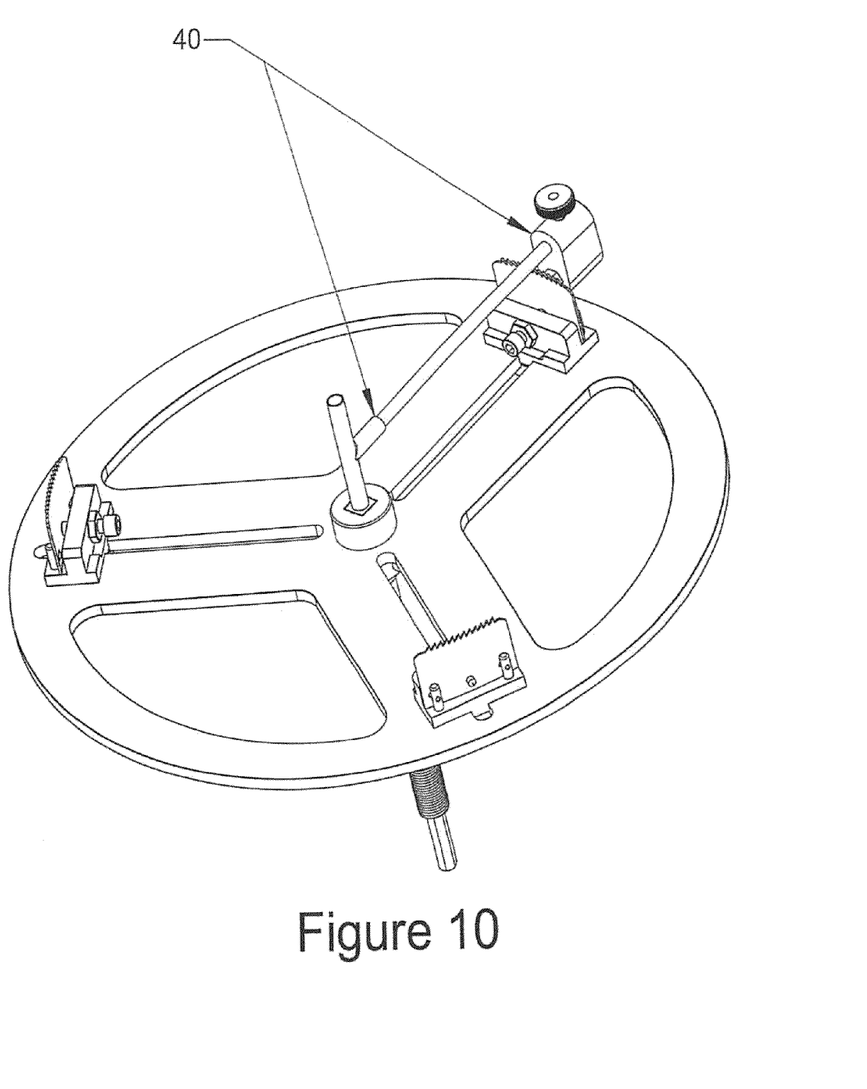
FIG. 10 shows a radius gauge mounted on the hole cutting apparatus to be used to compare the distance from the drive shaft of each of the blades or cutting members as they are positioned for cutting.

Referring to FIG. 10, the radius gauge assembly 40 is depicted with the tubular sleeve over the pilot drill bit and the adjustment rod located over a slot in the disc and the anvil block in position with the anvil against the outer edge of the blade at the apex of its arc.

A user will slide the tubular section of the radius gauge 40 over the pilot drill bit and locate it over the first slot for the blade holder assembly. The blade holder assembly is loosened from the disc and then slid until it rests against the tip of the anvil 45, and then the blade holder assembly is tightened at this position. The process is repeated for every additional blade and blade holder assembly in turn, and after all of the blade holder assemblies with their blades are positioned equidistant from the drive shaft, the radius gauge is removed from the hole cutting apparatus.

Figure 11:
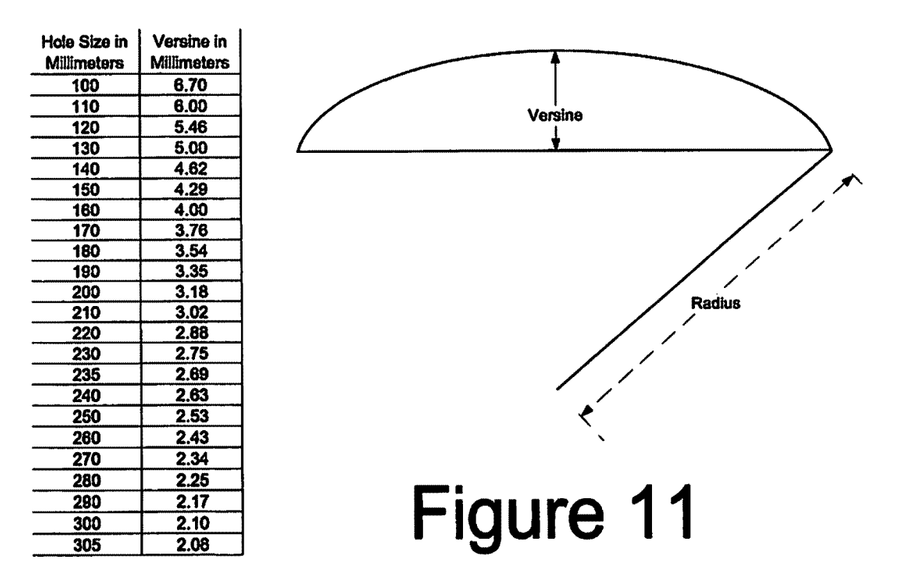
FIG. 11 shows the variation in the versine of the arc of a two inch long blade segment that needed as the radius of the hole changes.

Referring to FIG. 11, the versine changes significantly for the arc needed for a two inch long blade segment depending upon the radius of the hole to be cut. This requires a separate mechanism, embodied in the present invention, to adjust the arc of the blade in the apparatus and maintain that blade's arc during the cutting operation.

While the preferred embodiment of the invention has been illustrated and described, it will be appreciated that various changes can be made therein without departing from the spirit and scope of the invention.

What is claimed is:

1. An adjustable hole cutter for cutting a hole with a predetermined diameter in sheet or panel material, comprising:
   a blade holder that moves along a track or slot to alter a diameter of the cut hole;
   a blade arc adjuster coupled to the blade holder; and
   a replaceable blade segment coupled to the blade holder the replaceable blade segment being retained in an arced shape by the blade arc adjuster to define an arc with an apex, the arc being adjustable by the blade arc adjuster.

2. The hole cutter of claim 1, wherein the track or slot is provided in a disc or in a spoke on a hub, wherein there exists one or more of the track or slot and an equal number of blade holders.

3. The hole cutter of claim 1, wherein the blade holder enables quick changing of the replaceable blade segments to replace worn ones or to change to a blade with a different cutting edge that is optimized for the material to be cut.

4. The hole cutter of claim 1, wherein said blade arc adjuster includes a screw that is manipulated to provide incremental changes to the arc of the replaceable blade segment to conform to the arc for the radius of the hole being cut.

5. An adjustable hole cutter for cutting a hole with a redetermined diameter in sheet or panel material, comprising:
   a blade holder that moves along a track or slot to alter a diameter of the cut hole;
   a blade arc adjuster coupled to the blade holder; and
   a replaceable blade segment coupled to the blade holder, wherein two pins are used to retain the blade segment in the blade holder to adjust the arc of the blade segment.

6. The hole cutter of claim 1, further comprising:
   a second blade holder that moves along a track or slot to alter a diameter of the cut hole;
   a second blade arc adjuster coupled to the second blade holder; and
   a second replaceable blade segment coupled to the second blade holder, the second replaceable blade segment being retained in an arced shape by the second blade arc adjuster to define an arc with an apex, such that the replaceable blade segment and the second replaceable blade segment match each other's cutting radius and arc to minimize power needed to operate the cutter.

7. An adjustable hole cutter for cutting a hole with a redetermined diameter in sheet or panel material, comprising:
   a blade holder that moves along a track or slot to alter a diameter of the cut hole;
   a blade arc adjuster coupled to the blade holder; and
   a replaceable blade segment coupled to the blade holder, wherein the replaceable blade segment has a central hole and two slots to restrict its movement in the blade holder while allowing for bending it to the desired amount of arc.

8. The hole cutter of claim 1, wherein the hole cutter has three or more replaceable blade segments and three or more blade holders.

9. The hole cutter of claim 1, wherein the hole cutter works with or without an external shield.

10. The hole cutter of claim 1, further comprising an external shield.

11. The hole cutter of claim 1, further comprising a disc or a spoked wheel holding the blade holder assemblies, said disc or spoked wheel providing a hub, the hole cutter further comprising a shaft having a square section mounted to said hub.

12. The hole cutter of claim 11, wherein the square section of the shaft easily separates from the hub.

13. The hole cutter of claim 11, wherein the shaft has a compression spring that keeps a shield in place and a nut is used to keep the spring in tension and used to limit the effective cutting depth of the blades so that they cut only the surface of the work piece and not wires or pipes or other items hidden behind or beneath.

14. The hole cutter of claim 1, wherein a radius gauge is used to insure that all the blades are equidistant from a drive shaft or arbor of the hole cutting apparatus.

15. An adjustable hole cutter for cutting a hole with a predetermined diameter in sheet or panel material, comprising:
- a blade holder that moves along a track or slot to alter a diameter of the cut hole, the blade holder having a base plate;
- a disc or spoked wheel coupled to the blade holder;
- a replaceable blade segment coupled to the blade holder and having an arced shape defining an arc with an apex;
- a blade arc adjuster coupled to the blade holder and structured to adjust the arc of the replaceable blade segment;
- a drive shaft with a square section to mount into a hub of the disc or a spoked wheel for the hub, wherein the hub and drive shaft move in unison with a pin or screw that transects the drive shaft and hub; and
- one or more markings on the base plate to indicate a position for adjusting the apex of the arc of the replaceable blade segment for the predetermined diameter and wherein each mark is a nominal value for the diameter of the hole to be cut.

\* \* \* \* \*